United States Patent [19]

Komuro et al.

[11] 4,111,867
[45] Sep. 5, 1978

[54] RUBBER COMPOSITION FOR TIRE TREADS

[75] Inventors: Keiji Komuro, Yokohama; Tetsu Ohishi, Tokyo; Tetsuo Waku; Nagatoshi Sugi, both of Yokohama; Souichi Suzuki, Tokuyama; Akio Ueda, Yokohama, all of Japan

[73] Assignee: Nippon Zeon Co., Ltd., Tokyo, Japan

[21] Appl. No.: 782,323

[22] Filed: Mar. 29, 1977

[30] Foreign Application Priority Data

Apr. 5, 1976 [JP] Japan .................................. 51-37206
Apr. 14, 1976 [JP] Japan .................................. 51-42063

[51] Int. Cl.² ............................................. C08L 7/00
[52] U.S. Cl. ................................... 260/5; 260/23.7 R; 260/23.7 M; 260/33.6 AQ; 526/337; 526/340
[58] Field of Search .............. 260/5, 33.6 AQ, 23.7 R, 260/23.7 M, 79.5 C, 79.5 P; 526/337, 340

[56] References Cited

U.S. PATENT DOCUMENTS

| 2,384,545 | 9/1945 | Fryling | 526/340 |
| 3,401,213 | 9/1968 | Trementozzi et al. | 526/340 |
| 3,496,154 | 2/1970 | Wofford | 526/337 |
| 3,498,960 | 3/1970 | Wofford | 526/337 |
| 3,795,651 | 3/1974 | Yamaguchi et al. | 526/340 |
| 3,795,652 | 3/1974 | Yamaguchi et al. | 526/340 |
| 3,868,344 | 2/1975 | Newberg et al. | 526/337 |

Primary Examiner—Melvyn I. Marquis
Attorney, Agent, or Firm—Sherman & Shalloway

[57] ABSTRACT

A rubber composition for tire treads includes (Ia) an oil-extended rubber having a Mooney viscosity ($ML_{1+4}$, 100° C) of 20 to 70 which is prepared by adding 20 to 80 parts of a hydrocarbon oil to 100 parts by weight of a rubber terpolymer which is composed of 2 to 13% by weight of combined styrene, 15 to 70% by weight of combined 1,3-butadiene and 17 to 83% by weight of combined 1,3-pentadiene with the dienes having a total 1,4-bond content of at least 65 mole%, (II) vulcanization additives, and (III) 30 to 110 parts by weight, per 100 parts by weight of the oil-extended rubber (Ia), of a carbon black for rubber having an average particle diameter of not more than 60 mµ the rubbery copolymer has a glass transistion temperature of −70° to −20° C., and is produced by emulsion-polymerization at 0° to 30° C.

10 Claims, No Drawings

RUBBER COMPOSITION FOR TIRE TREADS

This invention relates to a rubber composition for tire treads comprising an oil-extended product of a rubbery terpolymer of styrene, 1,3-butadiene and 1,3-pentadiene, vulcanization additives, and carbon black.

Rubber materials for treads of automobile tires must meet the following requirements.

(1) They should achieve high wet skid resistance in vulancizates in order to secure running safety and good braking ability of automobiles.

(2) They should achieve high abrasion resistance in vulcanizates in order to secure good durability of tires.

(3) They should achieve low heat build-up of tires under repeated deformation in order to reduce heat build-up during high-speed running.

(4) They should have good extruding characteristics for easy production of tire treads.

The rubber materials now in use cannot easily meet all of these requirements. For example, wet skid resistance, or skid resistance on wet roads, and abrasion resistance both relate closely to the glass transition temperature of rubber, and moreover, they are conflicting characteristics. It was reported that with a styrene/1,3-butadiene copolymer rubber, an increase in the amount of combined styrene increases its wet skid resistance, but decreases its abrasion resistance [Rubber Chemistry and Technology, Vol. 44 (1971), pages 996–1014; and Rubber Age, April (1974), pages 46–55]. The same tendency is observed in an oil-extended product of the styrene/1,3-butadiene copolymer rubber.

A terpolymer of styrene, 1,3-butadiene and 1,3-pentadiene with a high styrene content is known from U.S. Pat. No. 2,384,545, and Soviet Rubber Technology (translation of "Kauchuki Rezina"), Vol. 20, No. 7, pages 2–5 and No. 8, pages 2–4 (1961). A vulcanized product of the terpolymer disclosed in these publications, in fact, is not commercially available as tire treads because it has poor abrasion resistance and permits high heat build-up. Furthermore, the extrudability of the terpolymer of styrene, 1,3-butadiene and 1,3-pentadiene, one important processing characteristic in tread fabrication, is much lower than that of the styrene/1,3-butadiene copolymer rubber, and this causes another drawback in practical use.

It is an object of this invention therefore to provide a rubber composition for tire treads which has superior extrudability and can afford vulcanized products having high wet skid resistance and superior abrasion resistance and ensuring low heat build-up.

We have now found that the object of this invention can be achieved by using an oil-extended rubber (Ia) having a Mooney viscosity ($ML_{1+4}$, 100° C.) of 20 to 70 or a mixture (I) of the oil-extended rubber (Ia) and another hydrocarbon rubber (Ib) in a specified mixing ratio, the oil-extended rubber (Ia) being prepared by adding 20 to 80 parts by weight of a hydrocarbon oil to 100 parts by weight of a rubbery terpolymer which is composed of 2 to 13% by weight of combined styrene, 15 to 70% by weight of combined 1,3-butadiene and 17 to 83% by weight of combined 1,3-pentadiene as rubber components with the dienes having a total 1,4-bond content of at least 65 mole%, has a glass transition temperature of −70° to −20° C., and is produced by emulsion-polymerization at 0° to 30° C.

Thus, according to the present invention, there are provided a rubber composition consisting essentially of the oil-extended rubber (Ia), vulcanization additives (II), and 30 to 110 parts by weight, per 100 parts by weight of the oil-extended rubber, of a carbon black for rubber having an average particle diameter of not more than 60 mμ; and a rubber composition consisting essentially of a mixture (I) having a Mooney viscosity ($ML_{1+4}$, 100° C.) of 10 to 100 and composed of at least 20% by weight, preferably 40 to 95% by weight, of the oil-extended rubber (Ia) and at most 80% by weight, preferably 5 to 60% by weight, of the other hydrocarbon rubber (Ib), the vulcanization additives (II), and the carbon black (III) for rubber.

The rubbery terpolymer used in the present invention can be produced by ordinary emulsion-polymerization techniques except that the polymerization temperature is maintained at 0° to 30° C.

Examples of suitable polymerization initiators are (1) persulfates such as potassium persulfate and ammonium persulfate; (2) azo compounds such as 2,2′-azobis-(isobutyronitrile) and 4,4′-azobis(4-cyanovaleric acid); (3) organic peroxides such as benzoyl peroxide and methyl ethyl ketone peroxide; and (4) common polymerization initiators such as a redox system composed of an oxidizing agent and a reducing agent. Examples of the oxidizing agent are organic hydroperoxides such as diisopropylbenzene hydroperoxide, cumene hydroperoxide, paramenthane hydroperoxide, tertiary butyl isopropylbenzene hydroperoxide and cyclohexylbenzene hydroperoxide. The reducing agent includes, for example, (1) complex compounds formed between formic acid, citric acid, metasilicic acid, ethylenediaminetetraacetic acid, ethylene-dinitrotetraacetic acid or a sodium or potassium salt thereof, and heavy metals such as iron, copper or chromium, and (2) ferrous pyrophosphate or ferrous sulfate. Such reducing agents may be used together with activators such as sodium sulfite, sodium bisulfite, formaldehyde sodium sulfoxylate, and reducing sugars (e.g., dextrose, or fructose). Of these, redox initiators comprising organic hydroperoxides and the reducing agents are preferred in order to obtain sufficient polymerization rates at relatively low temperatures.

Typical examples of emulsifiers used in emulsion polymerization are anionic surface-active agents such as fatty acid soaps, disproportionated rosin acid soap, tall oil soap, sodium alkylbenzenesulfonates, sodium alkylsulfonates, and sodium salts of higher alcohol monosulfuric acid esters. Cationic, nonionic and amphoteric surface active agents can also be used. If desired, these emulsifiers may be used together with dispersing agents such as a sodium salt of a naphthalenesulfonic acid/formaldehyde condensate, and inorganic salts such as sodium pyrophosphate or potassium chloride.

Molecular weight controllers are not required in particular, but as needed, mercaptans such as tertiary dodecyl mercaptan, normal dodecyl mercaptan or tertiary hexadecyl, mercaptan, carbon tetrachloride, and carbon tetrabromide may be used to control the molecular weight of polymer.

Other chemicals usually employed in emulsion polymerization may also be used.

A monomeric mixture consisting of 2 to 13% by weight of styrene, 6 to 70% by weight of 1,3-butadiene and 17 to 92% by weight of 1,3-pentadiene is charged, and polymerized to a conversion of 10 to 99%, usually 50 to 90%, to afford the rubbery terpolymer having the composition as specified hereinabove. Preferably, the rubbery terpolymer used in the present invention has a composition consisting of 4 to 11% by weight of combined styrene, 25 to 60% by weight of combined 1,3-butadiene, and 29 to 71% by weight of combined 1,3-pentadiene. In order to obtain a terpolymer of this composition, the monomeric mixture to be charged should consist of 4 to 11% by weight of styrene, 10 to 55% by weight of 1,3-butadiene and 34 to 86% by weight of 1,3-pentadiene. The composition of the copolymer may somewhat vary according to the cis-to-trans ratio of the 1,3-pentadiene used, but in the present invention, the 1,3-pentadiene used may have any ratio between cis- and trans-isomers.

The polymerization may be carried out batchwise, semibatchwise or continuously. It is also possible to perform seed polymerization in which a separately prepared terpolymer latex is added at the initiation of the polymerization. Or the mechanical stability of the latex during or after polymerization can be increased by recycling a part of the resulting latex from the later stage to the initial stage in the continuous polymerization process. It is also possible to control the rate of polymerization, and the distribution of composition or molecular weight of the terpolymer by adding a part of the monomers or polymerization chemicals, especially a polymerization initiator or molecular weight controller, during the reaction.

The polymerization temperature must be adjusted to 0° to 30° C. in order to obtain a terpolymer having superior processing characteristics and capable of affording vulcanized products having high tensile strength and resistance to heat build-up. The operating conditions such as the temperature or the stirring conditions may be changed as needed during the reaction.

The contents of combined styrene, combined 1,3-butadiene and combined 1,3-pentadiene in the resulting terpolymer affect the properties of a final rubber composition to be prepared from the terpolymer. When the content of combined styrene is less than 2% by weight, the wet skid resistance and tensile strength are low, and when it exceeds 13% by weight, the abrasion resistance is reduced and heat build-up is high. When the content of combined 1,3-pentadiene is less than 17% by weight, the wet skid resistance is low, and when it exceeds 83% by weight, the abrasion resistance and tensile strength are low. If the content of combined 1,3-pentadiene exceeds 70% by weight and the content of combined styrene is less than 2% by weight, the processing characteristics of the composition become poor.

The contents of combined styrene and combined 1,3-pentadiene in the rubbery terpolymer can be measured by nuclear magnetic resonance spectroscopy. Specifically, the content of combined styrene is calculated from the size of a signal inherent to the styrene ring in the vicinity of 7 ppm ($\delta$) (this means that the chemical shift from tetramethylsilane is 7 ppm; the same will apply hereinbelow) in the nuclear magnetic resonance spectrum (solvent: carbon tetrachloride) of the terpolymer. The content of 1,3-pentadiene can be calculated from the total sum of the sizes of signals inherent to the methyl group in the vicinity of 0.9 ppm ($\delta$) in the nuclear magnetic resonance spectrum.

The total content (mole%) of the 1,4-bonds of the dienes is determined from (1) the 1,2-bonded 1,3-pentadiene content which is calculated from the size of a signal inherent to the methyl group of the 1,2-bonded 1,3-pentadiene in the vicinity of 1.6 ppm ($\delta$) of the nuclear magnetic resonance spectrum (solvent: carbon tetrachloride), and (2) the sum of the 1,2-bonded 1,3-butadiene content and the 3,4-bonded 1,3-pentadiene content which are calculated from the size of a signal inherent to the vinyl group in the vicinity of 4.9 ppm ($\delta$). The determination, however, is made under the assumption that combined 1,3-butadiene consists of only 1,2-bond and 1,4-bond, and combined 1,3-pentadiene consists only of 1,2-bond, 3,4-bond and 1,4-bond.

The glass transition temperature of the terpolymer denotes the temperature at which the loss Young's modulus E" obtained by measuring the dynamic viscoelasticity of the terpolymer becomes maximum.

The oil-extended rubber (Ia) is formed by adding an aromatic, aliphatic or naphthenic hydrocarbon oil preferably in the emulsified state to the resulting terpolymer in latex form, and coagulating and drying the mixture, in the same way as in the usual oil-extension of synthetic rubbers. In order to obtain oil-extended products having good processing characteristics and ensuring good vulcanizate properties, it is preferred to use terpolymers having a relatively high molecular weight, that is, those having a Mooney viscosity ($ML_{1+4}$, 100° C.) of 50 to 180. The amount of the hydrocarbon oil is 20 to 80 parts by weight per 100 parts by weight of the terpolymer. When a hydrocarbon oil is not added to the terpolymer or its amount is less than 20 parts by weight, the rubber composition finally obtained has poor extruding characteristics, and does not afford tire treads of superior shapes. If the amount of the hydrocarbon oil added exceeds 80 parts by weight, it tends to migrate to the tire carcass, and the performance of the tire tread obtained becomes poor. The resulting oil-extended rubber (Ia) has a Mooney viscosity ($ML_{1+4}$, 100° C.) of 20 to 70. The Mooney viscosity ($ML_{1+4}$, 100° C.) is the value of $ML_{1+4}$ measured at 100° C. in accordance with JIS K-6300. When the Mooney viscosity of the oil-extended rubber is less than 20, the strength characteristics of the vulcanizate are poor. When it exceeds 70, the resulting rubber composition has poor extruding characteristics.

As stated hereinabove, a mixture having Mooney viscosity ($ML_{1+4}$, 100° C.) of 10 to 100 and consisting of at least 20%, preferably 40 to 95%, by weight of the oil-extended rubber (Ia) and at most 80%, preferably 5 to 60%, by weight of another hydrocarbon rubber (Ib) may be used instead of the oil-extended rubber (Ia) alone.

Examples of the other hydrocarbon rubber (Ib) are diolefinic rubbers such as polybutadiene rubber, styrene/butadiene copolymer rubber, acrylonitrile/butadiene copolymer rubber, synthetic polyisoprene rubber, butadiene/propylene copolymer rubber, butadiene/pentadiene copolymer rubber and natural rubber, and monolefinic rubbers such as ethylene/propylene copolymer rubber, polypentenamer and isoprene/isobutylene copolymer rubber. There is no particular limitation on the method of production of such rubbers. For example, the polybutadiene rubber may be high-cis polybutadiene rubber produced by ordinary solution polymerization, polybutadiene having a vinyl bond content of not more than 60% obtained by polymerization with a lithium-type catalyst, and polybutadiene rubber produced by emulsion polymerization. The styrene/butadiene copolymer may be produced by emulsion polymerization, or by polymerization in the presence of lithium-type catalysts or alfin catalysts.

Of the hydrocarbon rubbers (Ib) exemplified above, the polybutadiene rubber, styrene/butadiene copolymer rubber, synthetic polyisoprene rubber, natural rubber, and trans-polypentenamer are especially preferred in the present invention. The polybutadiene rubber, above all, is a very useful material for tire treads since it further improves the abrasion resistance of vulcanizates while retaining the properties of the terpolymer.

The hydrocarbon rubber (Ib) may also be oil-extended. The method of oil-extension and the amount of an oil to be used are the same as those described hereinabove with regard to the oil-extended rubber (Ia).

The vulcanization additives (II) used in this invention include (1) vulcanizing agents such as organosulfur compounds (e.g., inorganic sulfurs, thiuram polysulfide and morpholine disulfide), selenium, tellurium and organic peroxides; (2) vulcanization aids such as compounds of metals of Groups II and III of the periodic table (e.g., magnesium oxide, zinc oxide, calcium oxide, calcium hydroxide, magnesium carbonate, zinc carbonate, zinc stearate and zinc oleate), higher fatty acids (e.g., stearic acid, oleic acid and lauric acid), and amines (e.g., ethanolamine); (3) vulcanization accelerators such as aldehyde-amines (e.g., an aldehyde/aniline reaction product), guanidines (e.g., diphenylguanidine), thiazoles (e.g., 2-mercaptobenzothiazole, 2-mercaptobenzothiazole zinc salt, and dibenzothiazyl disulfide), sulfenamides (e.g., N-cyclohexyl-2-benzothiazyl sulfenamide) and thiurams (e.g., tetramethylthiuram disulfide). In the present invention, these additives can be used in optional combinations. The amounts of the additives (III) are usually 0.5 to 10 parts by weight for the vulcanizing agent, 0.5 to 10 parts by weight for the vulcanization aid, and 0.3 to 5 parts by weight for the vulcanization accelerator, per 100 parts of the oil-extended rubber (Ia) or per 100 parts by weight of the mixture (I) of the oil-extended rubber (Ia) and the hydrocarbon rubber (Ib).

The carbon black (III) having an average particle diameter of not more than 60 m$\mu$ for use in rubber reinforcement includes, for example, SAF (Super Abrasion Furnace), ISAF (Intermediate Super Abrasion Furnace), HAF (High Abrasion Furnace), and EPC (Easy Processing Channel). The amount of the carbon black (II) used is 30 to 110 parts by weight, especially 40 to 100 parts by weight, per 100 parts by weight of the oil-extended rubber (Ia) or the mixture (I) of the oil-extended rubber (Ia) and the other hydrocarbon rubber (Ib). The carbon black may be added to the oil-extended product of the rubbery terpolymer by an ordinary mixer such as rolls or a Banbury mixer. Or it may be added after the end of the polymerization reaction and before coagulating and drying the rubber latex.

If desired, the rubber composition of this invention for tire treads may further include conventional rubber compounding additives such as reinforcing agents, fillers, softening agents, processing aids and antioxidants.

Tire treads having superior wet skid resistance and low abrasion and heat build-up can be obtained by molding the rubber composition of the invention described hereinabove and curing the molded product at 120° to 200° C. for 5 to 120 minutes.

The following examples specifically illustrate the present invention. All parts and percentages of the polymer components and additives in these examples are by weight.

EXAMPLES

1. Production of Terpolymers

Polymerization was performed in a pressure reactor using the following polymerization recipe at the temperatures shown in Tables 1 and 2.

| Polymerization recipe | |
|---|---|
| A mixture of styrene, 1,3-butadiene, and 1,3-pentadiene* (mixture of 35.1% of cis-1,3-pentadiene, 64.3% of trans-1,3-pentadiene and 0.6% of impurities) | 100 parts |
| Water | 200 parts |
| Disproportionated rosin acid potassium salt soap | 2.25 parts |
| Fatty acid potassium salt soap | 2.25 parts |
| Sodium salt of naphthalene-sulfonic acid/formaldehyde condensate | 0.2 part |
| Potassium chloride | 0.8 part |
| $FeSO_4 \cdot 7H_2O$ | |
| Trisodium ethylene-diaminetetraacetate | |
| Diisopropylbenzene hydroperoxide | See Tables 1 and 2 |
| Formaldehyde sodium sulfoxylate | |
| Tertiary dodecyl mercaptan | |

After a lapse of each of the polymerization times indicated in Tables 1 and 2, 0.2 part of sodium dimethyl dithiocarbamate was added to the reaction mixture to stop the polymerization. Most of the remaining unreacted 1,3-butadiene and 1,3-pentadiene were removed from the reaction mixture by heating, and then, 1.5 parts of phenyl β-naphthylamine (antioxidant) was added per 100 parts of the polymer solids. To the resulting latex was added 37.5 parts, per 100 parts of the rubber solids, of a high aromatic hydrocarbon oil in the emulsified state. The mixture was then creamed with sodium chloride, and coagulated with sulfuric acid. The crumbs obtained were washed with water, and dried at about 50° C. under reduced pressure to form test samples. In the preparation of Samples Nos. 12, 13 and 14, the addition of the hydrocarbon oil to the latex was omitted.

The properties of the samples are shown in Tables 1 and 2. The combined 1,3-butadiene content is the value obtained by subtracting the total amounts of the combined styrene and the combined 1,3-pentadiene from 100%. The glass transition temperature of the samples was measured at a temperature raising rate of 2° C./minute and 110 Hz using a direct-reading dynamic viscoelasticity measuring instrument (Vibron DDV-II, a product of Toyo Sokki Sha).

The ratio of cis to trans in the combined dienes in the terpolymer of Sample No. 4 before oil extension was determined by infrared absorption spectroscopy. It was found that the molar ratio of (cis-1,4-pentadiene + cis-1,2-pentadiene + cis-1,4-butadiene) to (trans-1,4-butadiene) was 1 : 4.2.

2. Test (1) for the Properties of Vulcanizates

Compounds of the oil-extended products of Samples Nos. 1 to 11 were prepared in accordance with the following compounding recipe 1, and press-heated at 145° C. for 60 minutes to form vulcanization products. The properties of the vulcanizates were measured by the following methods, and the results are shown in Table 1.

Testing Methods (1) Tensile test, hardness test, and low temperature twisting test: JIS K-6301-1975

(2) Pico Laboratory Abrasion Test: ASTM D-2228 (1969), 60 rpm, load 4.5 kg (3) Goodrich flexometer heat build-up test: ASTM D-623-58 Method A, 1800 rpm, load 25 lbs, stroke 0.175 inch, 100° C., 25 minutes (4) Wet skid resistance test:

ASTM E303-69 portable skid resistance tester (designed by British Road Research Lab.) Concrete surface in the wet state

| Compounding recipe 1 | |
|---|---|
| Oil-extended product (Samples Nos. 1 to 11) (including oil) | 100 parts |
| Zinc oxide (#3) | 3 parts |
| Stearic acid | 1 part |
| Sulfur | 1.7 parts |
| N-tert.butyl-2-benzothiazyl sulfenamide | 1.0(1.2)* parts |
| HAF carbon black | 50 parts |
| Aromatic processing oil | 5 parts |

*From Samples Nos. 5 and 7, vulcanized products were prepared using the sulfenamide in an amount of 1.0 part and 1.2 parts, respectively.

It is seen from Table 1 that the Samples in accordance with this invention (Nos. 4, 5, 7, 8 and 9) afford vulcanizates having a well balanced combination of wed skid resistance, heat build-up resistance and abrasion resistance. When compared with Sample No. 1 which corresponds to an ordinary oil-extended styrene/butadiene copolymer rubber 1712, these Samples of the invention are found to have much the same abrasion resistance as Sample No. 1, and better wet skid resistance and heat build-up resistance. This advantage is retained even when the amount of N-tert.butyl-2-benzothiazyl sulfenamide is increased to bring the 300% tensile stress and hardness of the vulcanizates closer to those of Sample No. 1 (Samples Nos. 5* and 7*).

Samples having too high a combined styrene content (Samples Nos. 2 and 3) have poor abrasion resistance and develop high heat build-up. Samples not containing styrene (Samples Nos. 9 and 10) have a poor balance of abrasion resistance and wet skid resistance, and extremely low tensile strength.

A sample produced at a polymerization temperature of 50° C. (Sample No. 6) has good vulcanizate properties, but suffers from poor extruding characteristics as described hereinbelow.

3. Test for the Properties of Vulcanizates (2)

Compounds were prepared from Samples Nos. 12 to 14 (not oil-extended) in accordance with the following compounding recipe 2. The compounds were press-heated at 150° C. for 30 minutes to form vulcanization products. The properties of the vulcanizates were tested by the following methods. The results are shown in Table 2.

| Compounding recipe 2 | |
|---|---|
| Copolymer (Samples 12 to 14) | 100 parts |
| Zinc oxide (#3) | 3 parts |
| stearic acid | 2 parts |
| Sulfur | 1.8 parts |
| N-cyclohexyl-2-benzothiazyl sulfenamide | 1.2 parts |
| HAF carbon black | 50 parts |
| Aromatic processing oil | 5 parts |

It is seen from Table 2 that Sample No. 12 which corresponds to an ordinary styrene/1,3-butadiene copolymer rubber (1502) has good abrasion resistance, but low wet skid resistance and high heat build-up. Samples Nos. 13 and 14 achieve good vulcanizate properties, but have poor extruding characteristics as described hereinbelow.

Table 1

| | Samples | Comparison | | | Invention | | |
|---|---|---|---|---|---|---|---|
| | | 1 | 2 | 3 | 4 | | 5 |
| | Monomers Styrene | 29 | 25 | 20 | 10 | | 7 |
| | charged 1,3-Butadiene | 71 | 25 | 50 | 25 | 40 | 53 |
| | (parts) 1,3-Pentadiene | 0 | 50 | 30 | 65 | | |
| Polymeri- | $FeSO_4 \cdot 7H_2O$ | 0.01 | 0.026 | 0.015 | 0.01 | | 0.015 |
| zation | Trisodium ethylenediaminetetraacetate | 0.02 | 0.05 | 0.03 | 0.02 | | 0.03 |
| chemicals | Diisopropylbenzene hydroperoxide | 0.1 | 0.26 | 0.3 | 0.2 | | 0.3 |
| (parts) | Formaldehyde sodium sulfoxylate | 0.1 | 0.13 | 0.15 | 0.1 | | 0.15 |
| | Tertiary dodecyl mercaptan | 0.15 | 0 | 0.02 | 0 | | 0 |
| | Polymerization temperature (° C) | 5 | 5 | 15 | 15 | | 15 |
| | Polymerization conversion (%) | 59.9 | 60.3 | 62.2 | 60.1 | | 60.4 |
| | Polymerization time (hours) | 7.8 | 17.2 | 6.1 | 15.0 | | 8.8 |
| Properties | Mooney viscosity ($ML_{1+4}$, 100° C) | 115.0 | 106.0 | 95.5 | 102.5 | | 101.0 |
| of | | | | | | | |
| copolymer | Combined styrene (%) | 23.8 | 24.5 | 19.3 | 9.8 | | 7.4 |
| | Combined 1,3-butadiene (%) | 76.2 | 33.9 | 60.5 | 35.9 | | 50.6 |
| | Combined 1,3-pentadiene (%) | 0 | 41.6 | 20.2 | 54.3 | | 42.0 |
| | Total 1,4-bonds of the dienes (mole%) | — | — | — | 80.3 | | — |
| | Glass transition temperature (° C) | — | — | — | −44 | | — |
| | Mooney viscosity ($Ml_{1+4}$, 100° C) of the oil-extended product | 48.5 | 51.0 | 47.0 | 48.5 | | 50.5 |
| Properties | Tensile strength (kg/cm²) | 232 | 210 | 218 | 202 | | *201 |
| of | Elongation (%) | 500 | 520 | 490 | 530 | | 510 | 440 |
| vulcaniz- | 300% Tensile stress (kg/cm²) | 121 | 106 | 113 | 97 | | 104 | 120 |
| ates | Hardness (JIS spring type, A) | 57 | 55 | 56 | 54 | | 55 | 57 |
| | Amount of abrasion in Pico Test (cc) | 0.0353 | 0.0421 | 0.0405 | 0.0378 | | 0.0362 | 0.0341 |
| | Heat Build-up in Goodrich flexometer (° C) | 18.0 | 19.0 | 18.5 | 17.5 | | 16.5 | 15.5 |
| | Wet skid resistance | 62 | 65 | 63 | 67 | | 65 | 64 |

| | Samples | Comp. | Invention | | | Comparison | |
|---|---|---|---|---|---|---|---|
| | | 6 | 7 | 8 | 9 | 10 | 11 |
| | Monomers Styrene | 7 | 5 | 4 | 11 | 0 | 0 |
| | charged 1,3-Butadiene | 40 | 30 | 20 | 54 | 50 | 20 |
| | (parts) 1,3-Pentadiene | 53 | 65 | 76 | 35 | 50 | 80 |
| Polymeri- | $FeSO_4 \cdot 7H_2O$ | 0.0015 | 0.01 | 0.01 | 0.04 | 0.02 | 0.001 |
| zation | Trisodium ethylenediaminetetraacetate | 0.02 | 0.02 | 0.04 | 0.10 | 0.04 | 0.02 |
| chemicals | Diisopropylbenzene hydroperoxide | 0.3 | 0.2 | 0.10** | 0.10** | 0.4 | 0.2 |
| (parts) | Formaldehyde sodium sulfoxylate | 0.15 | 0.1 | 0.05 | 0.05 | 0.2 | 0.1 |

Table 1-continued

|  |  |  |  |  |  |  |  |
|---|---|---|---|---|---|---|---|
|  | Tertiary dodecyl mercaptan | 0 | 0 | 0 | 0.10 | 0 | 0 | 0 |
|  | Polymerization temperature (0° C) | 50 | 15 | 5 | 5 | 15 | 50 |
|  | Polymerization conversion (%) | 64.6 | 62.3 | 60.5 | 61.2 | 61.1 | 58.5 |
|  | Polymerization time (hours) | 6.7 | 15.5 | 6.0 | 9.5 | 6.4 | 19.3 |
| Properties of copolymers | Mooney viscosity ($ML_{1+4}$, 100° C) | 95.5 | 124.0 | 97.0 | 110.5 | 95.0 | 99.0 |
|  | Combined styrene (%) | 6.7 | 5.1 | 4.4 | 10.2 | 0 | 0 |
|  | Combined 1,3-butadiene (%) | 50.3 | 40.2 | 28.0 | 64.2 | 62.6 | 26.4 |
|  | Combined 1,3-pentadiene (%) | 43.0 | 54.7 | 67.6 | 25.6 | 37.4 | 73.6 |
|  | Total 1,4-bonds of the dienes (mole%) | 80.8 | — | — | — | — | — |
|  | Glass transition temperature (° C) | −54 | — | — | — | — | — |
|  | Mooney viscosity ($ML_{1+4}$, 100° C) of the oil-extended product | 49.0 | 55.0 | 49.5 | 54.0 | 50.0 | 54.0 |
| Properties of vulcanizates | Tensile strength (kg/cm²) | 181 | 190 | *185 | 170 | 198 | 133 | 137 |
|  | Elongation (%) | 460 | 500 | 430 | 520 | 470 | 340 | 420 |
|  | 300% Tensile stress (kg/cm²) | 103 | 99 | 115 | 86 | 115 | 102 | 85 |
|  | Hardness (JIS spring type, A) | 55 | 54 | 56 | 53 | 55 | 54 | 53 |
|  | Amount of abrasion in Pico Test (cc) | 0.0379 | 0.0357 | 0.0340 | 0.0395 | 0.0331 | 0.0334 | 0.0436 |
|  | Heat build-up in Goodrich flexometer (° C) | 17.0 | 17.0 | 16.5 | 17.5 | 17.5 | 17.5 | 20.0 |
|  | Wet skid resistance | 65 | 66 | 65 | 65 | 63 | 59 | 61 |

*1.2 parts of N-tert.butyl-2-benzothiazyl sulfenamide was used.
**Instead of the diisopropylbenzene hydroperoxide, para-menthane hydroperoxide was used.

Table 2

| | Samples | 12 | Comparison 13 | 14 |
|---|---|---|---|---|
| Polymerization chemicals (parts) | Monomers charged (parts) Styrene | 29 | 10 | 7 |
|  | 1,3-Butadiene | 71 | 40 | 25 |
|  | 1,3-Pentadiene | 0 | 50 | 68 |
|  | $FeSO_4 \cdot 7H_2O$ | 0.01 | 0.02 | 0.04 |
|  | Trisodium ethylenediaminetetraacetate | 0.02 | 0.04 | 0.08 |
|  | Diisopropylbenzene hydroperoxide | 0.1 | 0.2 | 0.4 |
|  | Formaldehyde sodium sulfoxylate | 0.1 | 0.1 | 0.2 |
|  | Tetriary dodecyl mercaptan | 0.25 | 0.05 | 0 |
|  | Polymerization temperature (° C) | 5 | 5 | 5 |
|  | Polymerization conversion(%) | 60.3 | 60.5 | 58.7 |
|  | Polymerization time (hours) | 8.0 | 21.0 | 22.5 |
| Properties of copolymers | Mooney viscosity ($ML_{1+4}$, 100° C) | 52.0 | 52.5 | 54.5 |
|  | Combined styrene (%) | 23.7 | 9.2 | 7.4 |
|  | Combined 1,3-butadiene (%) | 76.3 | 52.0 | 35.6 |
|  | Combined 1,3-pentadiene (%) | 0 | 38.8 | 57.0 |
|  | Total 1,4-bonds of the dienes (mole%) | — | 81.6 | — |
|  | Glass transition temperature (° C) | −50 | −49 | −46 |
| Properties of vulcanizates | Tensile strength (kg/cm²) | 306 | 275 | 247 |
|  | Elongation (%) | 480 | 460 | 470 |
|  | 300% Tensile stress (kg/cm²) | 173 | 154 | 135 |
|  | Hardness (JIS spring type, A) | 64 | 62 | 62 |
|  | Amount of abrasion in Pico Test (cc) | 0.0250 | 0.0250 | 0.0255 |
|  | Heat build-up in Goodrich flexometer (° C) | 24.0 | 22.5 | 21.0 |
|  | Wet skid resistance | 61 | 63 | 65 |

4. Test for Extruding Characteristics

Compounds of Samples Nos. 1, 4, 5, 6 and 7 were prepared in accordance with the aforesaid compounding recipe 1 and compounds of Samples No. 12, 13 and 14 were prepared in accordance with the aforesaid compounding recipe 2, and tested for extruding characteristics in accordance with ASTM D2230 using a Garvey die at 80° C. and 25 rpm. The results are shown in Table 3.

Table 3

| Sample No. | 1 | 4* | 5* | 6 | 7* | 12 | 13 | 14 |
|---|---|---|---|---|---|---|---|---|
| Amount extruded (g/min.) | 35.7 | 35.3 | 37.3 | 35.0 | 37.0 | 32.0 | 29.0 | 26.0 |
| Shapes of the extrudate (ASTM rating) | | | | | | | | |
| Surface | 4 | 4 | 4 | 3 | 4 | 4 | 3 | 3 |
| Corner | 4 | 4 | 4 | 3 | 3 | 4 | 3 | 2 |
| Edge | 3 | 3 | 3 | 2 | 3 | 3 | 1 | 1 |
| Porosity | 4 | 3 | 4 | 3 | 4 | 4 | 3 | 3 |
| Total | 15 | 14 | 15 | 11 | 14 | 15 | 10 | 9 |

*Samples in accordance with the invention

It is seen from Table 3 that an ordinary styrene/1,3-butadiene copolymer rubber, either not oil-extended (Sample No. 12) or oil-extended (Sample No. 1), has good extruding characteristics, but in the case of a styrene/1,3-butadiene/1,3-pentadiene terpolymer, only the oil-extended product has good extruding characteristics (from a comparison of Samples Nos. 4, 5 and 7 with Samples Nos. 13 and 14). Even when oil-extended, a styrene/1,3-butadiene/1,3-pentadiene terpolymer prepared at a polymerization temperature of 50° C. has poor extruding characteristics (see Sample No. 6).

5. Test for the Properties of Vulcanizates (3)

Compounds were prepared in accordance with the compounding recipe shown in Table 4, and press-heated at 145° C. for 50 minutes to form vulcanizates. The vulcanizates were tested in the same way as in test (2), and the results are shown in Table 4.

The blend of the oil-extended product and the oil-extended cis-polybutadiene rubber had a Mooney viscosity ($ML_{1+4}$, 100° C.) of 48 in Runs Nos. 2 and 3, and 47 in Run No. 4.

Table 4

| Run No. | | 1 (Comparison) | 2 (Invention) | 3 | 4 |
|---|---|---|---|---|---|
| Compounding recipe (parts) | Oil-extended product (Sample No. 7; including oil) | — | 70 | 70 | 60 |
| | Oil-extended styrene/1,3-butadiene copolymer rubber *1 (including oil) | 70 | — | — | — |
| | Oil-extended cis-polybutadiene rubber *2 (including oil) | 30 | 30 | 30 | 40 |
| | Zinc oxide (#3) | 3 | 3 | 3 | 3 |
| | Stearic acid | 2 | 2 | 2 | 2 |
| | Sulfur | 1.7 | 1.7 | 1.7 | 1.5 |
| | N-oxydiethylene-2-benzothiazyl sulfenamide | 1.1 | 1.1 | 1.5 | 1.3 |
| | ISAF carbon black | 60 | 60 | 60 | 55 |
| | Aromatic processing oil | 5 | 5 | 5 | 2.5 |
| Properties of the vulcanizates | Tensile strength (kg/cm²) | 212 | 177 | 179 | 184 |
| | Elongation (%) | 440 | 450 | 390 | 460 |
| | 300% Tensile stress (kg/cm²) | 133 | 106 | 130 | 107 |
| | Hardness (JIS spring type A) | 62 | 60 | 62 | 60 |
| | Amount of abrasion in Pico Test (cc) | 0.0218 | 0.0216 | 0.0224 | 0.0201 |
| | Heat build-up in a Goodrich flexometer (° C) | 26.5 | 25.0 | 24.5 | 24.5 |
| | Wet skid resistance | 54 | 58 | 57 | 56 |

*1 Nipol 1712, a product of Nippon Zeon Co., Ltd.
*2 Nipol BR 1441, a product of Nippon Zeon Co., Ltd.

It is seen from Table 4 that the vulcanizate in Run No. 2 has much the same abrasion resistance as the vulcanizate of the comparison and much better wet skid resistance and lower heat build-up than the latter in spite of the fact that the compound recipe is the same for both polymers. It can be understood that this advantage is also obtained when the 300% tensile stress and hardness are brought close to those of the comparison (Run No. 3). The results also demonstrate that abrasion resistance is improved by increasing the proportion of the oil-extended cis-polybutadiene rubber (Run No. 4).

What we claim is:

1. A rubber composition for tire treads, said composition consisting essentially of
   (Ia) an oil-extended rubber having a Mooney viscosity ($ML_{1+4}$, 100° C.) of 20 to 70 and prepared by adding 20 to 80 parts of a hydrocarbon oil to 100 parts by weight of a rubbery terpolymer which is composed of 2 to 13% by weight of combined styrene, 15 to 70% by weight combined of 1,3-butadiene and 17 to 83% by weight of combined 1,3-pentadiene with the dienes having a total 1,4-bond content of at least 65 mole%, has a glass transition temperature of −70° to −20° C., and is produced by emulsion-polymerization at 0° to 30° C.,
   (II) vulcanization additives, and
   (III) 30 to 110 parts by weight, per 100 parts by weight of the oil-extended rubber (Ia), of a carbon black for rubber having an average particle diameter of not more than 60 mμ.

2. A rubber composition for tire treads, said composition consisting essentially of
   (I) a mixture consisting of at least 20% by weight of (Ia) an oil-extended rubber having a Mooney viscosity ($ML_{1+4}$, 100° C.) of 20 to 70 and (Ib) another hydrocarbon rubber in an amount of at most 80% by weight, said hydrocarbon rubber having a Mooney viscosity ($ML_{1+4}$, 100° C.) of 10 to 100, said oil-extended rubber being prepared by adding 20 to 80 parts by weight of a hydrocarbon oil to 100 parts by weight of combined styrene, 15 to 70% by weight of combined 1,3-butadiene and 17 to 83% by weight of combined 1,3-pentadiene with the dienes having a total 1,4-bond content of at least 65 mole%, has a glass transition temperature of −70° to −20° C., and is produced by emulsion-polymerization at 0° to 30° C.,
   (II) vulcanization additives, and
   (III) 30 to 110 parts by weight, per 100 parts by weight of the mixture (I), of a carbon black for rubber having an average particle diameter of not more than 60 mμ.

3. The composition of claim 1 wherein the rubbery terpolymer consists of 4 to 11% by weight of combined styrene, 25 to 60% by weight of combined 1,3-butadiene and 29 to 71% by weight of combined 1,3-pentadiene.

4. The composition of claim 1 wherein the hydrocarbon oil is an aromatic, aliphatic or naphthenic hydrocarbon oil.

5. The composition of claim 1 wherein the carbon black (III) is a member selected from the group consisting of SAF, ISAF, HAF, FEF and EPC.

6. The composition of claim 2 wherein the other hydrocarbon rubber (Ib) is a rubber selected from the group consisting of polybutadiene rubber, styrene/butadiene copolymer rubber, synthetic polyisoprene rubber, natural rubber and trans-polypentenamer, or an oil-extended product thereof.

7. The composition of claim 2 wherein the rubbery terpolymer consists of 4 to 11% by weight of combined styrene, 25 to 60% by weight of combined 1,3-butadiene and 29 to 71% by weight of combined 1,3-pentadiene.

8. The composition of claim 2 wherein the hydrocarbon oil is an aromatic, aliphatic or naphthenic hydrocarbon oil.

9. The composition of claim 2 wherein the carbon black (III) is a member selected from the group consisting of SAF, ISAF, HAF, FEF and EPC.

10. The composition of claim 2 wherein the rubber mixture (I) consists of 40 to 95% by weight of the oil-extended rubber (Ia) and 5 to 60% by weight of the hydrocarbon rubber (Ib).

* * * * *